(12) United States Patent
Jeong et al.

(10) Patent No.: US 12,469,570 B2
(45) Date of Patent: Nov. 11, 2025

(54) MEMORY DEVICE AND METHOD OF OPERATING THE SAME

(71) Applicant: SK hynix Inc., Gyeonggi-do (KR)

(72) Inventors: Chan Hui Jeong, Gyeonggi-do (KR); Dong Hun Kwak, Gyeonggi-do (KR); Se Chun Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 197 days.

(21) Appl. No.: 18/318,725

(22) Filed: May 17, 2023

(65) Prior Publication Data
US 2024/0177785 A1    May 30, 2024

(30) Foreign Application Priority Data

Nov. 24, 2022   (KR) ........................ 10-2022-0159091

(51) Int. Cl.
*G11C 16/34*    (2006.01)
*G11C 16/04*    (2006.01)
*G11C 16/10*    (2006.01)
*G11C 16/14*    (2006.01)
*G11C 16/32*    (2006.01)

(52) U.S. Cl.
CPC ...... *G11C 16/3459* (2013.01); *G11C 16/0433* (2013.01); *G11C 16/102* (2013.01); *G11C 16/14* (2013.01); *G11C 16/32* (2013.01)

(58) Field of Classification Search
CPC .................................................. G11C 16/3459
USPC ..................................................... 365/185.22
See application file for complete search history.

(56) References Cited

U.S. PATENT DOCUMENTS

2015/0309857 A1* 10/2015 Weilemann, II .... G06F 11/1068
714/47.3

FOREIGN PATENT DOCUMENTS

| KR | 10-2019-0108347 A | 9/2019 |
|----|-------------------|--------|
| KR | 10-2019-0112421 A | 10/2019 |

* cited by examiner

*Primary Examiner* — Anthan Tran
(74) *Attorney, Agent, or Firm* — IP & T GROUP LLP

(57) ABSTRACT

The present technology relates to an electronic device. According to the present technology, a memory device may include a plurality of memory cells, a peripheral circuit, and a control logic. The peripheral circuit may perform a fail bit detection operation on memory cells selected from among the plurality of memory cells. The control logic may control the peripheral circuit to set target parameters related to a main operation based on a comparison result between a fail bit detection time measured in the fail bit detection operation and a reference time, and perform the main operation on the selected memory cells based on the target parameters.

17 Claims, 16 Drawing Sheets

FIG. 9

Read Offset Table

| Read Operation | | | | |
|---|---|---|---|---|
| tDIF | Vr | Vrp | tEVAL | PB_SENSE |
| tDIF<t1 | Vr_1 | Vrp_1 | tEVAL_1 | VPB_1 |
| t1≤tDIF<t2 | Vr_2 | Vrp_2 | tEVAL_2 | VPB_2 |
| ⋮ | ⋮ | ⋮ | ⋮ | ⋮ |
| tN-1≤tDIF<tN | Vr_N | Vrp_N | tEVAL_N | VPB_N |

FIG. 10

Program Offset Table

| | Program Operation | | |
|---|---|---|---|
| tDIF | Vpgm_start | Vpp | Vstep |
| tDIF<t1 | Vpgm_s1 | Vpp_1 | Vstep_1 |
| t1≤tDIF<t2 | Vpgm_s2 | Vpp_2 | Vstep_2 |
| ⋮ | ⋮ | ⋮ | ⋮ |
| tN−1≤tDIF<tN | Vpgm_sN | Vpp_N | Vstep_N |

FIG. 11

Erase Offset Table

| Erase Operation | |
|---|---|
| tDIF | Vers |
| tDIF<t1 | Vers_1 |
| t1≤tDIF<t2 | Vers_2 |
| ⋮ | ⋮ |
| tN−1≤tDIF<tN | Vers_N |

# MEMORY DEVICE AND METHOD OF OPERATING THE SAME

CROSS-REFERENCE TO RELATED APPLICATION

The present application claims priority under 35 U.S.C. § 119(a) to Korean patent application number 10-2022-0159091 filed on Nov. 24, 2022, the entire disclosure of which is incorporated by reference herein.

BACKGROUND

1. Field of Invention

The present disclosure relates to an electronic device, and more particularly, to a memory device and a method of operating the same.

2. Description of Related Art

A memory device may include a plurality of memory cells. A characteristic of the plurality of memory cells may vary according to a position and a use frequency of the memory cell. As time elapses after a memory operation is performed on the memory cells, retention in which a charge trapped in the memory cell is discharged, may occur. The retention may indicate a degree of deterioration of the memory cells, and may cause a decrease of reliability of a read operation, a program operation, and an erase operation performed by the memory device under control of a memory controller. Therefore, the memory device may improve reliability of the memory operation by determining a deterioration degree of the memory cell before performing the memory operation and performing the memory operation based on target parameters determined according to the deterioration degree.

SUMMARY

An embodiment of the present disclosure provides a memory device and a method of operating the memory device, capable of performing a memory operation with a parameter optimized according to a deterioration degree of a memory cell.

According to an embodiment of the present disclosure, a memory device may include a plurality of memory cells, a peripheral circuit, and a control logic. The peripheral circuit may perform a fail bit detection operation on memory cells selected from among the plurality of memory cells. The control logic may control the peripheral circuit to set target parameters related to a main operation based on a comparison result between a fail bit detection time measured in the fail bit detection operation and a reference time, and perform the main operation on the selected memory cells based on the target parameters.

According to an embodiment of the present disclosure, a method of operating a memory device may include performing a fail bit detection operation on memory cells selected from among a plurality of memory cells, setting target parameters related to a main operation to be performed on the selected memory cells based on a comparison result between a fail bit detection time measured in the fail bit detection operation and a reference time, and performing the main operation on the selected memory cells based on the target parameters.

According to an embodiment of the present disclosure, a method of operating a memory device including a plurality of memory cells, the method comprises initializing at least one memory cell selected from among the plurality of memory cells, sensing a cell current of the selected memory cell to detect a time until the cell current exceeds a reference current, determining one or more operation parameters based on the detected time, and performing at least one of read, program and erase operations on the selected memory cell based on the operation parameters.

According to the present technology, a memory device and a method of operating the same performing a memory operation with a parameter optimized according to a deterioration degree of a memory cell are provided.

BRIEF DESCRIPTION OF THE DRAWINGS

FIG. 9 is a diagram illustrating a read offset table according to an embodiment of the present disclosure.

FIG. 10 is a diagram illustrating a program offset table according to an embodiment of the present disclosure.

FIG. 11 is a diagram illustrating an erase offset table according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
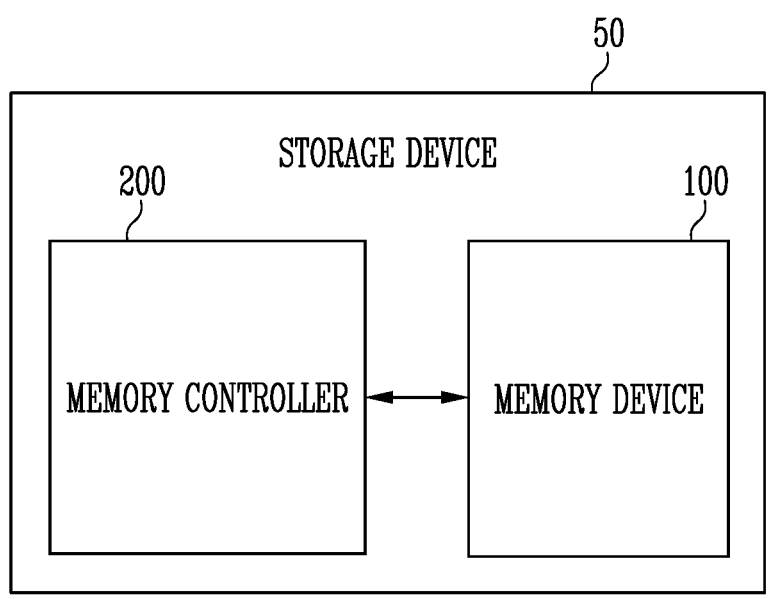
FIG. 1 is a diagram illustrating a storage device according to an embodiment of the present disclosure.

FIG. 1 is a diagram illustrating a storage device 50 according to an embodiment of the present disclosure.

Referring to FIG. 1, the storage device 50 may include a memory device 100 and a memory controller 200 that controls an operation of the memory device 100. The storage device 50 is a device that stores data under control of a host such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host. For example, the storage device 50 may be configured as any of various types of storage devices such as an SSD, a multimedia card in a form of an MMC, an eMMC, an RS-MMC, and a micro-MMC, a secure digital card in a form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

The memory cell array may include a plurality of memory blocks. Each memory block may include a plurality of memory cells. One memory block may include a plurality of pages. In an embodiment, each page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

In an embodiment, the memory device 100 may initialize a channel of selected memory cells before a sensing operation. The sensing operation may include the read operation, a program verify operation, and an erase verify operation. The memory device 100 may perform a fail bit detection operation in a period in which the channel of the selected memory cells is initialized. The fail bit detection operation may be an operation of measuring a time required until a fail bit is detected in the selected memory cells.

The memory device 100 may set target parameters related to a main operation based on a comparison result between a fail bit detection time measured in the fail bit detection operation and a reference time. The memory device 100 may perform the main operation on the selected memory cells based on the target parameters. The main operation may include the read operation, the program operation, and the erase operation.

Figure 2:
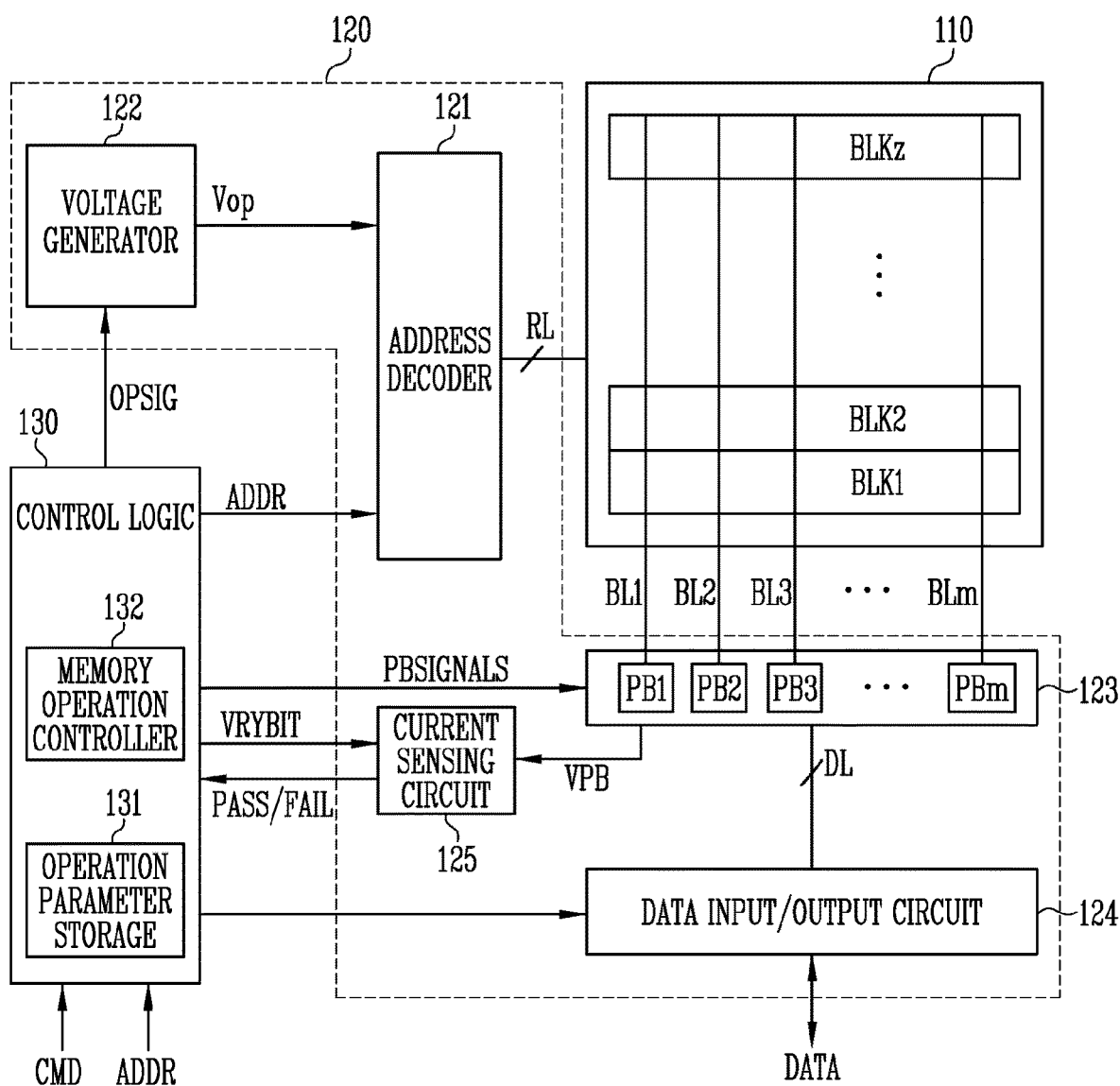
FIG. 2 is a diagram illustrating a structure of a memory device of FIG. 1.

FIG. 2 is a diagram illustrating a structure of the memory device 100 of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as an SLC that stores one bit of data, an MLC that stores two bits of data, a TLC that stores three bits of data, or a QLC that stores four bits of data.

The peripheral circuit 120 may include the address decoder 121, a voltage generator 122, the read and write circuit 123, a data input/output circuit 124, and a current sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and apply a pass voltage of a level less than that of the program voltage to unselected word lines.

During the sensing operation, the address decoder 121 may apply a sensing voltage to the selected word line and apply a sensing pass voltage of a level greater than that of the sensing voltage to the unselected word lines. The sensing operation may include the read operation, the program verify operation, and the erase verify operation.

For example, during the program verify operation, the address decoder 121 may apply a verify voltage to the selected word lines and apply a verify pass voltage of a level greater than that of the verify voltage to the unselected word lines. During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the read and write circuit 123. In an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130. In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of operation voltages Vop may be supplied to the memory cell array 110 through the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

In an embodiment, the read and write circuit 123 may apply a bit line voltage set according to the control of the control logic 130 to bit lines connected to the memory cells. The read and write circuit 123 may perform a sensing operation on the memory cells during a sensing time set according to the control of the control logic 130. The sensing operation may be an operation of verifying a threshold voltage of the memory cells, and may include the read operation, the program verify operation, and the erase verify operation.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the current sensing circuit 125 may generate a reference current in response to a signal of an allowable bit VRYBIT generated by the control logic 130. Further, the current sensing circuit 125 may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the current sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write control signal to the read and write circuit 123, and output the allowable bit VRYBIT to the current sensing circuit 125. In addition, the control logic 130 may determine whether the verify operation is passed or failed in response to the pass or fail signal PASS/FAIL output by the current sensing circuit 125.

In an embodiment, the peripheral circuit 120 may perform the fail bit detection operation on the selected memory cells before performing the main operation on the selected memory cells among the plurality of memory cells. The fail bit detection operation may be an operation of measuring a time required until a fail bit is detected in the selected memory cells.

In an embodiment, the peripheral circuit 120 may include the current sensing circuit 125.

The current sensing circuit 125 may measure the fail bit detection time based on a comparison result between a cell current flowing through a plurality of bit lines connected to the plurality of memory cells and the reference current. The current sensing circuit 125 may measure a time from a time point when an enable signal is applied to the current sensing circuit to a time point when the cell current exceeds the reference current as the fail bit detection time. The current sensing circuit 125 may measure the fail bit detection time in a reference clock unit.

The control logic 130 may set the target parameters related to the main operation based on a comparison result between the fail bit detection time measured in the fail bit detection operation and the reference time. The control logic 130 may control the peripheral circuit 120 to perform the main operation based on the target parameters.

In an embodiment, the control logic 130 may include an operation parameter storage 131 and a memory operation controller 132.

The operation parameter storage 131 may store offset tables including a plurality of parameters related to the main operation set according to a difference value between the fail bit detection time and the reference time. The main operation may include the read operation, the program operation, and the erase operation.

The memory operation controller 132 may select the target parameters from the offset table stored in the operation parameter storage 131 based on the difference value between the fail bit detection time and the reference time. The memory operation controller 132 may control the peripheral circuit 120 to perform the main operation according to the target parameters.

The memory operation controller 132 may control the peripheral circuit 120 to initialize the channel of the selected memory cells before the sensing operation. The sensing operation may include the read operation, the program verify operation, and the erase verify operation. The memory operation controller 132 may control the current sensing circuit 125 to perform the fail bit detection operation in the period in which the channel of the selected memory cells is initialized. The fail bit detection operation may be an operation of measuring a time required until the fail bit is detected in the selected memory cells.

Figure 3:
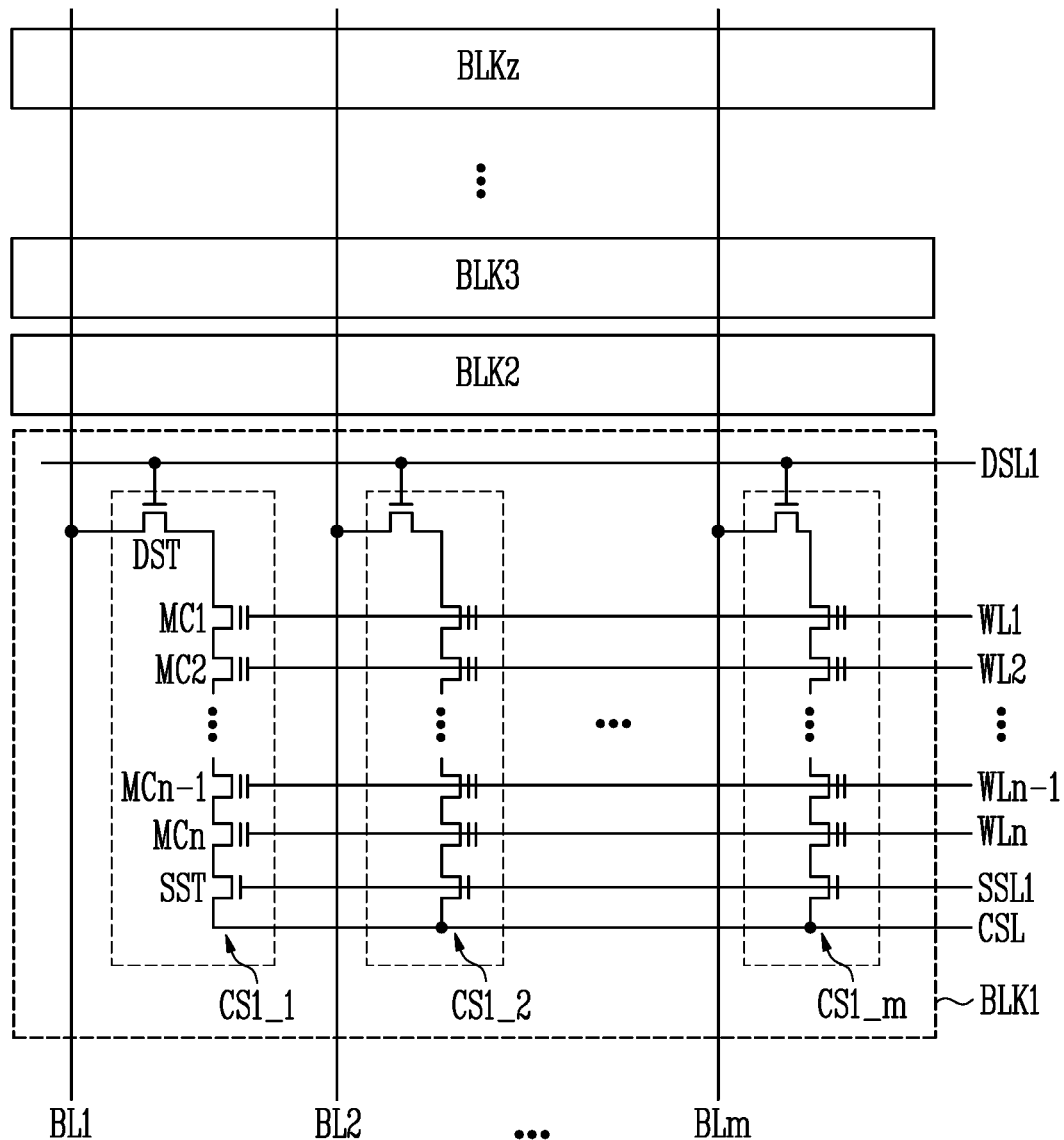
FIG. 3 is a diagram illustrating a memory cell array of FIG. 2.

FIG. 3 is a diagram illustrating the memory cell array 110 of FIG. 2.

Referring to FIG. 3, the first to z-th memory blocks BLK1 to BLKz are commonly connected to the first to m-th bit lines BL1 to BLm. In the illustrated example of FIG. 3, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz is configured similarly to the first memory block BLK1.

The memory block BLK1 may include a plurality of cell strings CS1_1 to CS1_m (m is a positive integer). The first to m-th cell strings CS1_1 to CS1_m are connected to the first to m-th bit lines BL1 to BLm, respectively. Each of the first to m-th cell strings CS1_1 to CS1_m includes a drain select transistor DST, a plurality of memory cells MC1 to MCn connected in series (n is a positive integer), and a source select transistor SST.

Gate terminals of the drain select transistors DST included in each of the first to m-th cell strings CS1_1 to CS1_m are connected to a drain select line DSL1. Gate terminals of the first to n-th memory cells MC1 to MCn included in each of the first to m-th cell strings CS1_1 to CS1_m are connected to the first to n-th word lines WL1 to WLn, respectively. Gate terminals of the source select transistors SST included in each of the first to m-th cell strings CS1_1 to CS1_m are connected to a source select line SSL1.

In an example, a structure of the cell string will be described with reference to the first cell string CS1_1 of the plurality of cell strings CS1_1 to CS1_m. However, it will be understood that each of the remaining cell strings CS1_2 to CS1_m is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. In an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
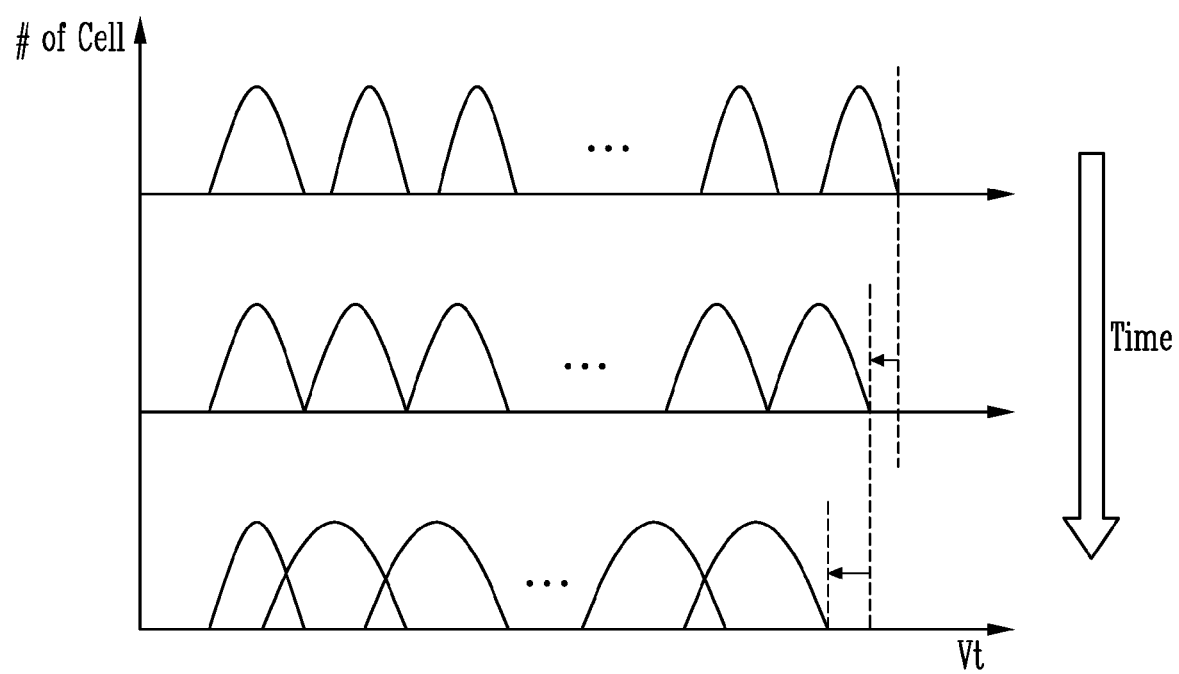
FIG. 4 is a diagram illustrating retention of a memory cell as a time elapses.

FIG. 4 is a diagram illustrating retention of the memory cell as a time elapses.

Referring to FIG. 4, retention is shown, in which a distribution of a threshold voltage Vt is shifted as a charge trapped in a gate of the memory cells is discharged, as a time elapses after the memory cells are programmed.

As a time elapses, the threshold voltage distribution of the memory cells may be shifted to a left. As the threshold voltage distribution is programmed to a higher program state, a tendency of which the threshold voltage distribution is shifted may increase. As a time elapses, a width of the threshold voltage distribution may increase and a margin between the threshold voltage distributions may decrease.

Figure 5:
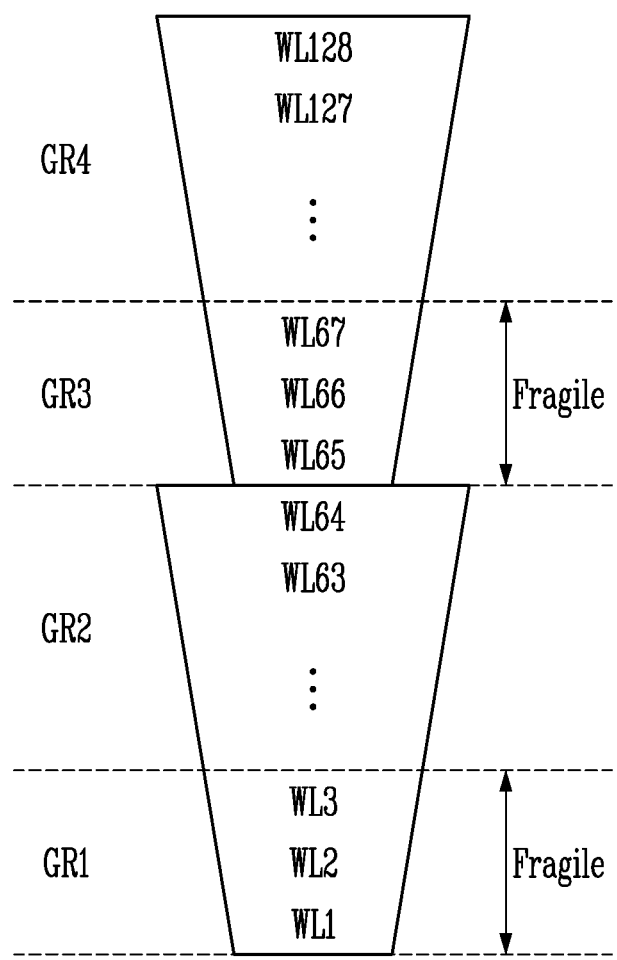
FIG. 5 is a diagram illustrating a fragile word line according to a structure and a position of memory cells.

FIG. 5 is a diagram illustrating a fragile word line according to a structure and a position of the memory cells.

Referring to FIG. 5, memory cells in a three-dimensional memory structure may have a stack structure.

For example, memory cells connected to a first word line WL1 to memory cells connected to a 128-th word line WL128 may be stacked from a lower portion to an upper portion. The memory cells connected to the first word line WL1 to the memory cells connected to the 128-th word line WL128 may be classified into first to fourth groups GR1 to GR4 according to the structure and the position.

Since widths of channels connected to the memory cells are different, a characteristic of the memory cells may vary according to the position of the memory cells. As the width of the channel is decreased, an influence of retention may increase and the tendency of which the threshold voltage distribution of the memory cells is shifted may increase. Therefore, memory cells connected to word lines belonging to the first and third groups GR1 and GR3 may be memory cells connected to fragile word lines, and may have a poor characteristic compared to other groups.

Figure 6:
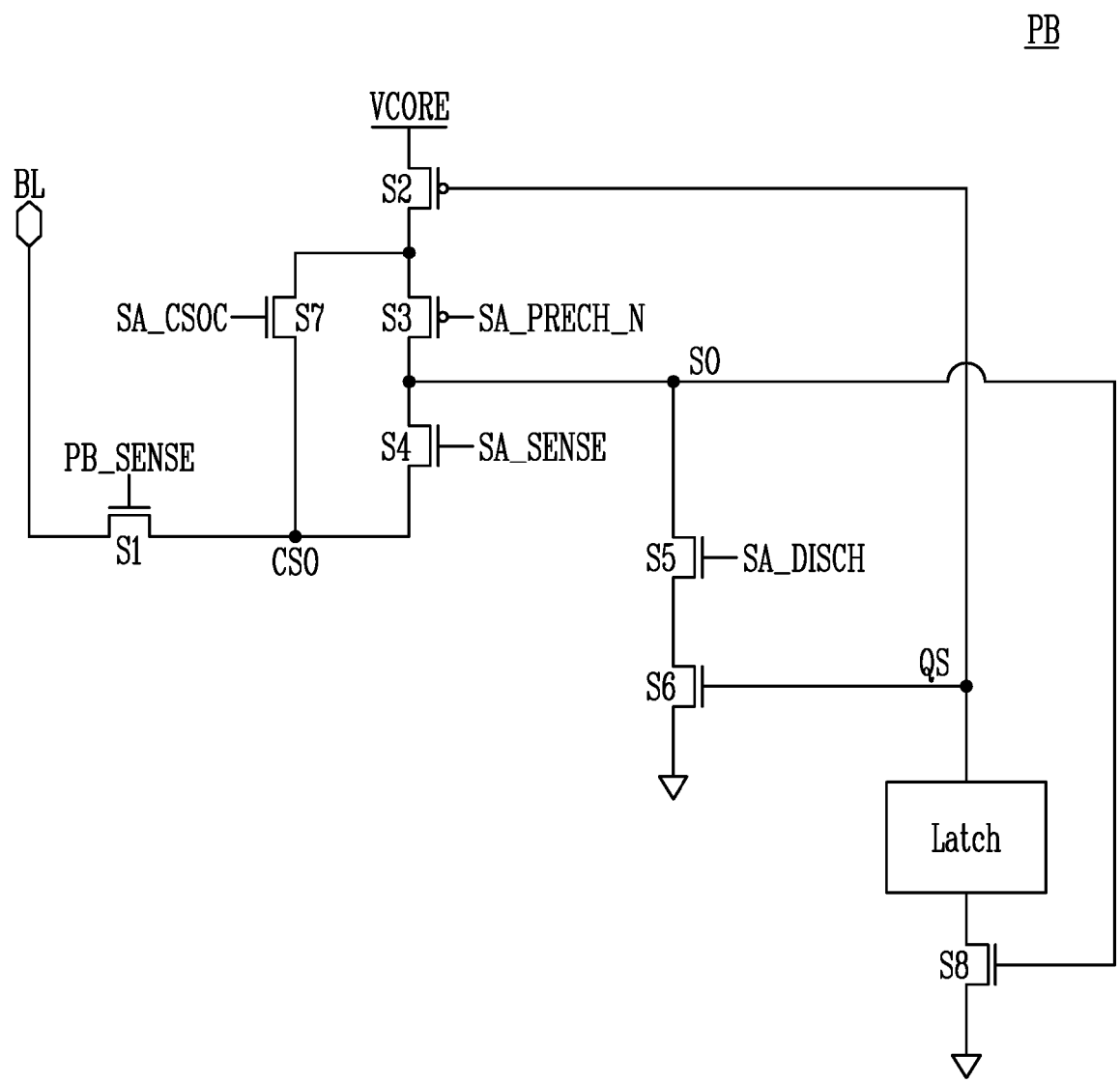
FIG. 6 is a diagram illustrating a page buffer according to an embodiment.

FIG. 6 is a diagram illustrating a page buffer PB according to an embodiment of the present disclosure.

Referring to FIG. 6, the page buffer PB may be connected to a memory cell through a bit line BL. The page buffer PB may include first to sixth transistors as switches S1 to S6 and a latch. The page buffer PB may further include seventh and eighth switches S7 and S8.

In FIG. 6, the first switch S1 may be connected between the bit line BL and a common sensing node CSO, and may be controlled according to a page buffer PB control signal PB_SENSE.

The second switch S2 and the third switch S3 may be connected in series between a power node for a power voltage VCORE and a sensing node SO. The second switch S2 may be controlled according to a data signal QS stored in the latch. The third switch S3 may be controlled according to a precharge signal SA_PRECH_N.

The fourth switch S4 may be connected between the common sensing node CSO and the sensing node SO, and may be controlled according to a sensing transferal signal SA_SENSE.

The fifth switch S5 and the sixth switch S6 may be connected in series between the sensing node SO and a ground voltage node. The fifth switch S5 may be controlled according to a discharge signal SA_DISCH. The sixth switch S6 may be controlled according to the data signal QS stored in the latch.

The seventh switch S7 may be connected between a connection portion of the second switch S2 and the third switch S3 and the common sensing node CSO. The seventh switch S7 may be controlled according to a precharge transmission signal SA_CSOC.

The eighth switch S8 is connected between the latch and the ground voltage node and may be controlled according to a potential value of the sensing node SO.

In an embodiment, the power voltage VCORE generated based on an external voltage may be applied to the power node. In another embodiment, the external voltage may be applied to the power node. A voltage applied to the power node is not limited to the present embodiment.

In FIG. 6, the page buffer PB may apply the power voltage VCORE to the sensing node SO through the power node during a preset time in the sensing operation. For example, the page buffer PB may turn off the first, fourth, fifth, and sixth switches S1, S4, S5, and S6 and turn off the second and third switches S2 and S3 during the preset time. Thereafter, the page buffer PB may turn on the first and fourth switches S1 and S4. As a current flow through the bit line BL according to the threshold voltage of the memory cell, a potential of the sensing node SO may be decreased.

In an embodiment, the first and fourth to eighth switches S1 and S4 to S8 may include NMOS transistors. The second and third switches S2 and S3 may include PMOS transistors. However, the transistor included in each switch is not limited to the present embodiment. An NMOS transistor may be replaced with a PMOS transistor. Conversely, a PMOS transistor may be replaced with an NMOS transistor.

Figure 7:
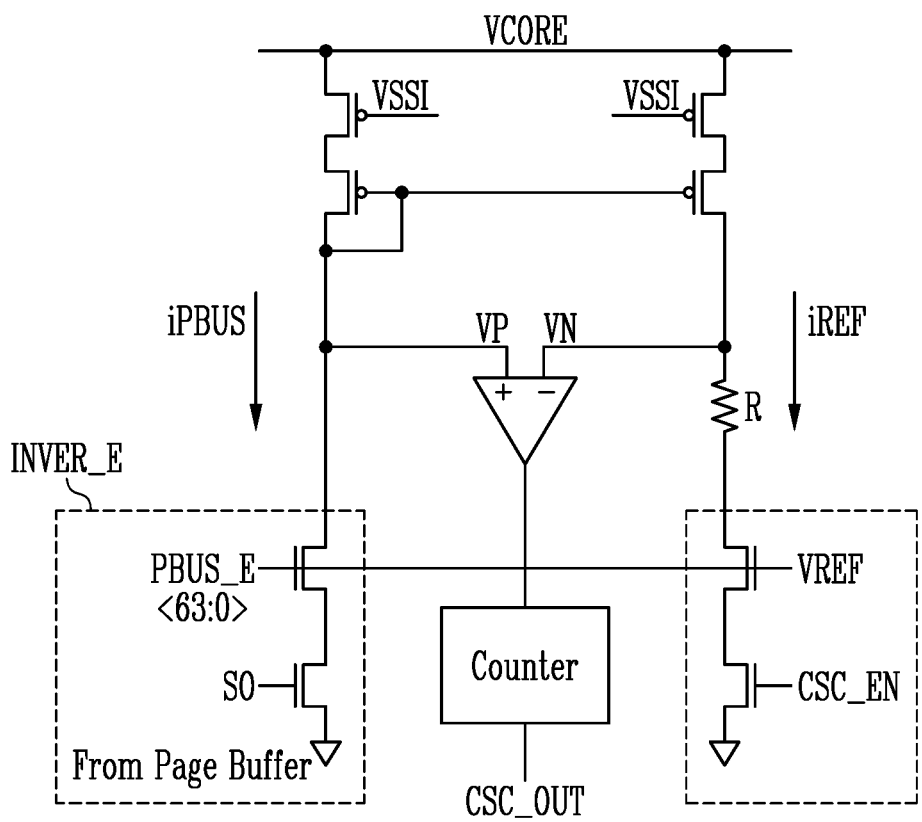
FIG. 7 is a diagram illustrating a current sensing circuit according to an embodiment of the present disclosure.

FIG. 7 is a diagram illustrating a current sensing circuit 125 according to an embodiment of the present disclosure.

Referring to FIG. 7, the current sensing circuit 125 may compare a cell current iPBUS flowing through the bit line according to the threshold voltage of the selected memory cell with a reference current iREF. After the current sensing circuit 125 is activated, when the selected memory cell is turned on, the cell current iPBUS may increase. When the cell current iPBUS exceeds the preset reference current iREF, an output CSC_OUT of the current sensing circuit 125 may transit from a logic low level to a logic high level. A time point when the output CSC_OUT of the current sensing circuit 125 transits from the logic low level to the logic high level may be a time point when the fail bit is detected in the selected memory cell. The fail bit detection time may be the time required until the fail bit is detected in the selected memory cell, and may be a time from a time point when the current sensing circuit 125 is activated to a time point when the output CSC_OUT of the current sensing circuit 125 transits from the logic low level to the logic high level.

In an embodiment, a counter included in the current sensing circuit 125 may measure the time required until the fail bit is detected in the selected memory cell based on a reference clock CLK. For example, the counter counts the number of reference clocks CLK from a time point when an activation signal CSC_EN of the current sensing circuit 125 transits from a logic low level to a logic high level to the time point when the output CSC_OUT of the current sensing circuit 125 transits from the logic low level to the logic high level. The counter may calculate the fail bit detection time based on the counted number of reference clocks CLK.

Figure 8:
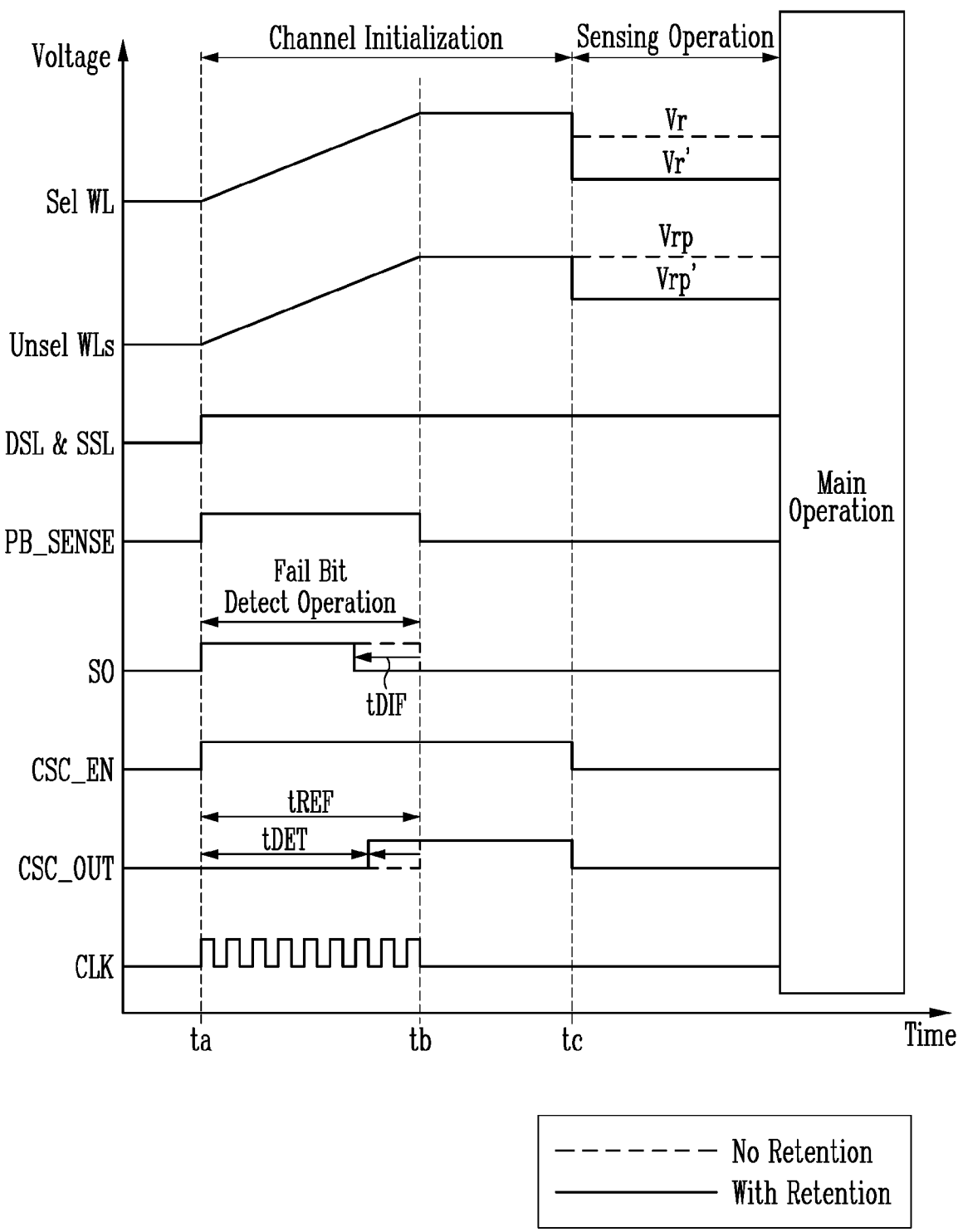
FIG. 8 is a timing diagram illustrating a fail bit detection operation according to an embodiment of the present disclosure.

FIG. 8 is a timing diagram illustrating a fail bit detection operation according to an embodiment of the present disclosure.

Referring to FIGS. 2 and 8, the memory operation controller 132 may control the current sensing circuit 125 to perform the fail bit detection operation in a period in which the channel of the selected memory cells is initialized before performing the sensing operation. The sensing operation may include the read operation, the program verify operation, a soft program verify operation, and the erase verify operation. The memory operation controller 132 may set parameters used in the main operation based on a result of the fail bit detection operation. The main operation may include the read operation, the program operation, and the erase operation. In a case of the read operation, the sensing operation and the main operation may be the same.

In FIG. 8, an example in which the sensing operation is the read operation is shown. The fail bit detection operation may be performed in a period between a time ta to a time tb of a period of a time ta to a time tc. The period between the time ta to the time tb is a period in which the channel of the selected memory cells is initialized. The fail bit detection operation may be the operation of measuring the time required until the fail bit is detected in the selected memory cells.

Specifically, the fail bit detection operation may be performed in the period of ta to tb in which a turn-on voltage is applied to a drain select line DSL, a source select line SSL, and a page buffer control signal PB_SENSE, and the pass voltage is applied to a selected word line Sel WL and unselected word lines Unsel WLs.

Specifically, at the time ta, the current sensing circuit 125 may be activated by the enable signal CSC_EN. The period of the time ta to the time tb in which the page buffer control signal is turned on and then turned off may be a period corresponding to a reference time tREF.

When the selected memory cell is turned on, the potential of the sensing node SO may be decreased as described with reference to FIGS. 6 and 7, and the output CSC_OUT of the current sensing circuit 125 may transit from the low level to the high level as the cell current becomes greater than the reference current.

In FIG. 8, a fail bit detection time tDET may be the time required until the fail bit is detected in the selected memory cell, and may be the time from the time point when the current sensing circuit 125 is activated to the time point when the output CSC_OUT of the current sensing circuit 125 transits from the logic low level to the logic high level.

As a difference value tDIF between the fail bit detection time tDET and the reference time tREF increases, it may be determined that a deterioration degree and a retention degree of the memory cell may increase.

Therefore, according to an embodiment of the present disclosure, the parameter related to the main operation may be set according to the difference value tDIF.

For example, since the difference value tDIF is 0 (zero) in an initial state without retention, during the read operation, a default read voltage Vr may be applied to the selected word line and a default read pass voltage Vrp may be applied to the unselected word lines.

In a case of a state in which retention exists as a time elapses, during the read operation, a read voltage Vr' set based on the difference value tDIF may be applied to the selected word line and a read pass voltage Vrp' may be applied to the unselected word lines.

That is, according to an embodiment of the present disclosure, reliability of the main operation may be improved by performing the main operation based on an optimization parameter set in consideration of the deterioration degree and the retention degree of the memory cell.

In another embodiment, channel initialization of the selected memory cells may be performed in the program verify operation, and the fail bit detection operation may be performed during a channel initialization period. Program parameters to be used in the program operation may be determined based on the difference value between the fail bit detection time and the reference time. The fail bit detection time may be obtained through the fail bit detection operation.

In another embodiment, the channel initialization of the selected memory cells may be performed in the soft program verify operation, and the fail bit detection operation may be performed during a channel initialization period. The soft program verify operation may be an operation of verifying the threshold voltage of the selected memory cells after a soft program operation is performed before the erase operation on the selected memory cells. Erase parameters to be used in the erase operation may be determined based on the difference value between the fail bit detection time and the reference time. The fail bit detection time may be obtained through the fail bit detection operation.

FIG. 9 is a diagram illustrating a read offset table according to an embodiment of the present disclosure.

Referring to FIGS. 2 and 9, the operation parameter storage 131 may store a read offset table including read parameters related to the read operation. The read offset table may include a plurality of read parameters determined according to the difference value tDIF between the fail bit detection time tDET and the reference time tREF described with reference to FIG. 8.

For example, the plurality of read parameters may include a read voltage Vr, a read pass voltage Vrp, a sensing time tEVAL in the read operation, and a level of the page buffer control signal PB SENSE. A type of the read parameter is not limited to the present embodiment. For example, the read parameter may further include application time of each of the read voltage and the read pass voltage.

FIG. 10 is a diagram illustrating a program offset table according to an embodiment of the present disclosure.

Referring to FIGS. 2 and 10, the operation parameter storage 131 may store a program offset table including program parameters related to the program operation.

The program offset table may include a plurality of program parameters determined according to the difference value tDIF between the fail bit detection time tDET and the reference time tREF described with reference to FIG. 8. For example, the plurality of program parameters may include a program start voltage Vpgm_start, a program pass voltage Vpp, and a step voltage Vstep. A type of the program parameter is not limited to the present embodiment. For example, the program parameter may further include an application time for each of the program voltage and the program pass voltage.

FIG. 11 is a diagram illustrating an erase offset table according to an embodiment of the present disclosure.

Referring to FIGS. 2 and 11, the operation parameter storage 131 may store an erase offset table including erase parameters related to the erase operation. The erase offset table may include the erase parameter determined according to the difference value tDIF between the fail bit detection time tDET and the reference time tREF described with reference to FIG. 8. For example, the erase parameter may include an erase voltage Vers. A type of the erase parameter is not limited to the present embodiment. For example, the erase parameter may further include an application time of the erase voltage.

Figure 12:
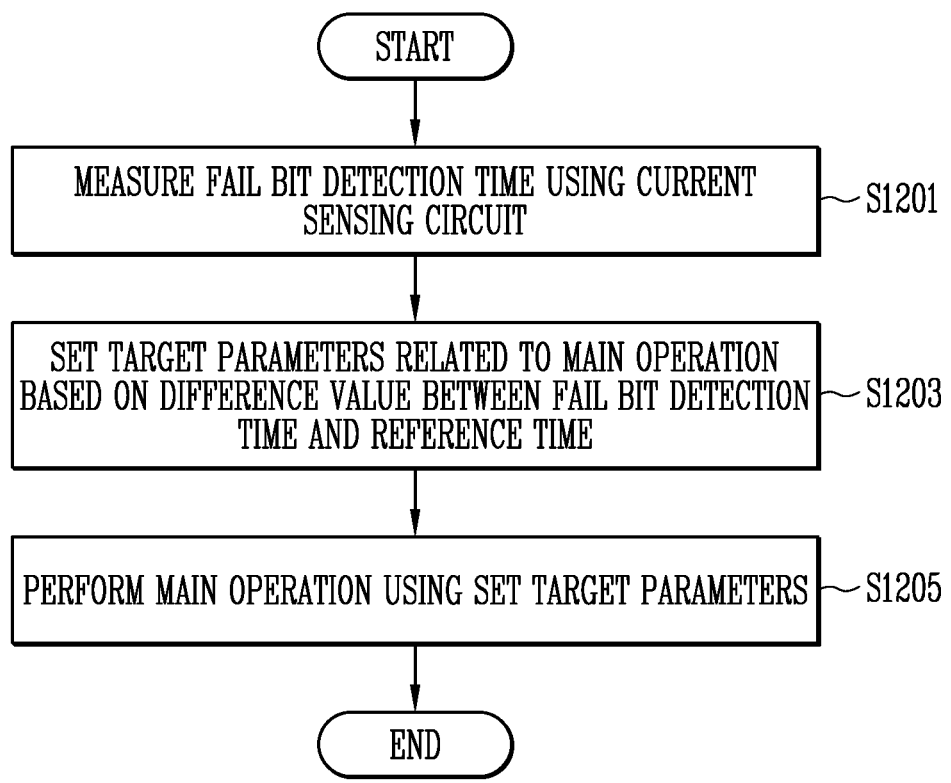
FIG. 12 is a flowchart illustrating an operation of a memory device according to an embodiment of the present disclosure.

FIG. 12 is a flowchart illustrating an operation of a memory device according to an embodiment of the present disclosure.

Referring to FIG. 12, in operation S1201, the memory device may measure the fail bit detection time for the selected memory cells using the current sensing circuit. An operation of measuring the fail bit detection time may be the fail bit detection operation.

In operation S1203, the memory device may set the target parameters related to the main operation based on the difference value between the fail bit detection time and the reference time. The difference value may indicate the deterioration degree or the retention degree of the selected memory cells. The main operation may be the read operation, the program operation, or the erase operation.

In operation S1205, the memory device may perform the main operation using the set target parameters. The memory device may improve reliability of the main operation by performing the main operation using the target parameters set in consideration of the retention degree or the retention degree of the memory cells.

Figure 13:
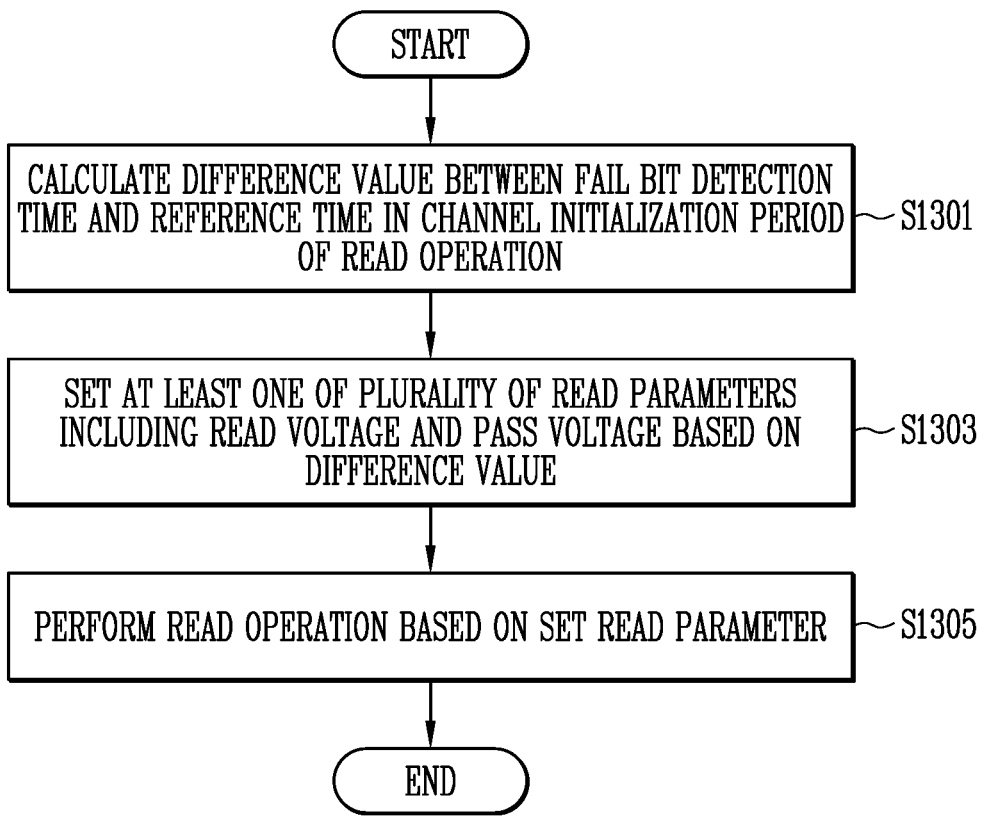
FIG. 13 is a flowchart illustrating an operation of a memory device according to an embodiment of the present disclosure.

FIG. 13 is a flowchart illustrating an operation of a memory device according to an embodiment of the present disclosure.

Referring to FIG. 13, in operation S1301, the memory device may calculate the difference value between the fail bit detection time and the reference time in the channel initialization period of the read operation.

In operation S1303, the memory device may set at least one of the plurality of read parameters including the read voltage and the pass voltage based on the difference value.

In operation S1305, the memory device may perform the read operation on the selected memory cells based on the set read parameter.

Figure 14:
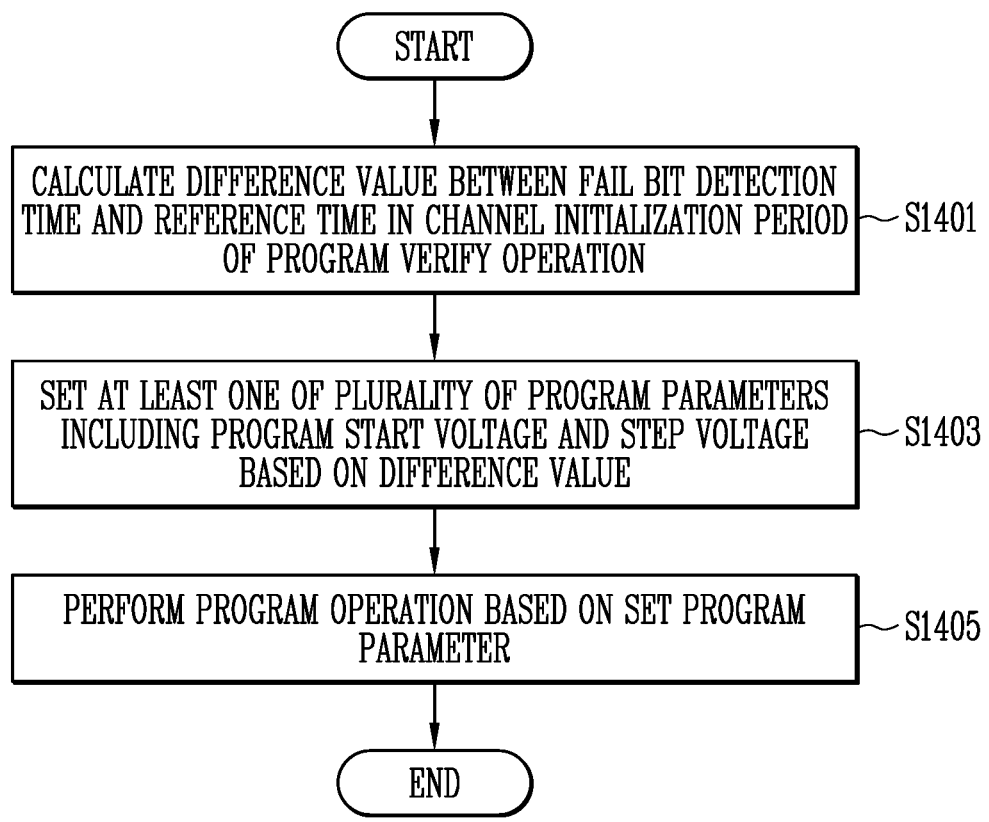
FIG. 14 is a flowchart illustrating an operation of a memory device according to an embodiment of the present disclosure.

FIG. 14 is a flowchart illustrating an operation of a memory device according to an embodiment of the present disclosure.

Referring to FIG. 14, in operation S1401, the memory device may calculate the difference value between the fail bit detection time and the reference time in the channel initialization period of the program verify operation.

In operation S1403, the memory device may set at least one of the plurality of program parameters including the program start voltage and the step voltage based on the difference value.

In operation S1405, the memory device may perform the program operation on the selected memory cells based on the set program parameter.

Figure 15:
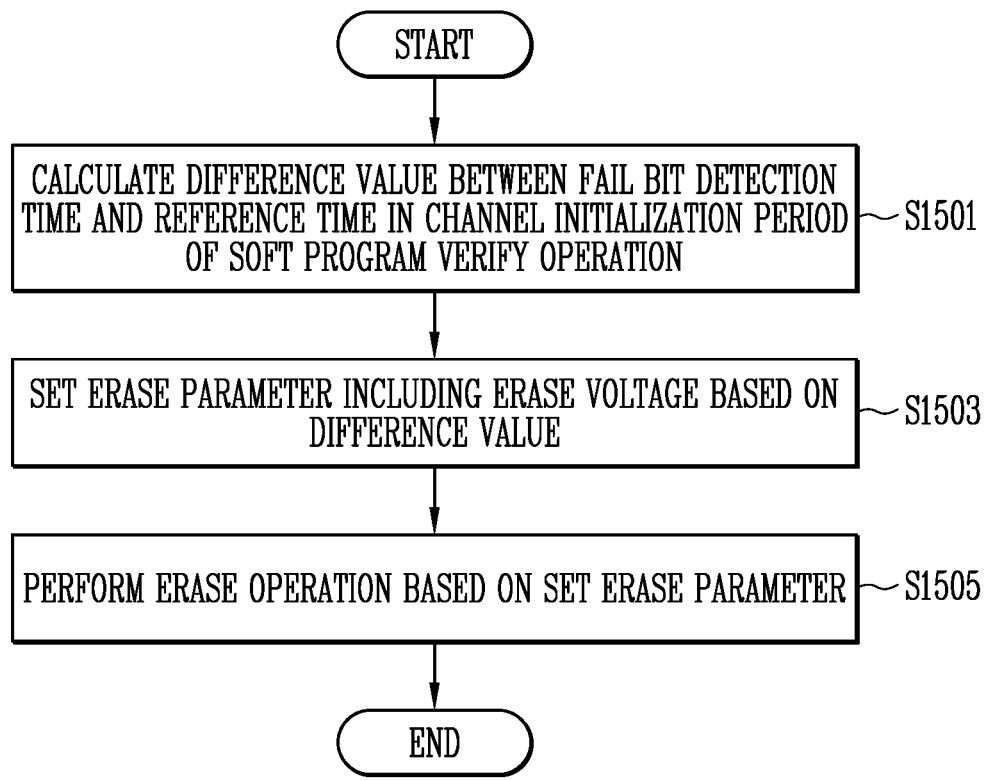
FIG. 15 is a flowchart illustrating an operation of a memory device according to an embodiment of the present disclosure.

FIG. 15 is a flowchart illustrating an operation of a memory device according to an embodiment.

Referring to FIG. 15, in operation S1501, the memory device may calculate the difference value between the fail bit detection time and the reference time in the channel initialization period of the soft program verify operation. The soft program operation may be an operation of increasing the threshold voltage of the selected memory cells to a predetermined level or higher before performing the erase operation on the selected memory cells. A phenomenon in which memory cells are deeply erased during the erase operation may be improved through the soft program operation. The soft program verify operation may be an operation of verifying the threshold voltage of the selected memory cells after the soft program operation is performed.

In operation S1503, the memory device may set the erase parameter including the erase voltage based on the difference value.

In operation S1505, the memory device may perform the erase operation on the selected memory cells based on the set erase parameter.

Figure 16:
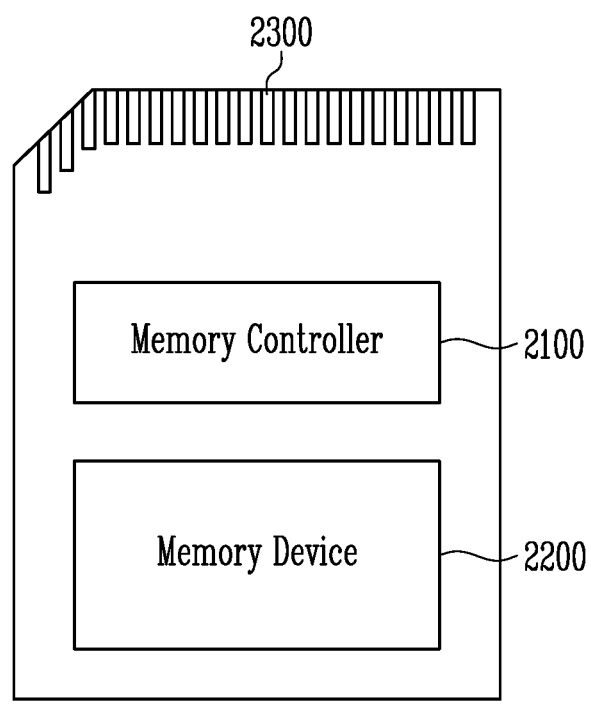
FIG. 16 is a block diagram illustrating a memory card system to which a storage device according to an embodiment of the present disclosure is applied.

FIG. 16 is a block diagram illustrating a memory card system 2000 to which a storage device according to an embodiment of the present disclosure is applied.

Referring to FIG. 16, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and an external device (e.g., a host). The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (e.g., MMC, RS-MMC, MMCmicro, or eMMC), a secure digital (SD) card (e.g., SD, miniSD, microSD, or SDHC), and a universal flash storage (UFS).

What is claimed is:

1. A memory device comprising:
a plurality of memory cells;
a peripheral circuit configured to perform a fail bit detection operation on memory cells selected from among the plurality of memory cells; and
a control logic configured to:
a) for the fail bit detection operation, compare a cell current flowing through a bit line of the memory cells with a reference current flowing in the control logic,
b) control the peripheral circuit to set target parameters related to a main operation of the memory device based on a comparison result between a fail bit detection time measured in the fail bit detection operation when the cell current exceeds the reference current and a reference time comprising a time period between turning a page buffer on and turning the page buffer off, wherein the comparison result comprises a difference value indicating a deterioration of the memory cells over time, and c) perform the main operation on the selected memory cells based on adjustments of the target parameters made in accordance with the difference value.

2. The memory device of claim 1, wherein the peripheral circuit comprises a current sensing circuit configured to measure the fail bit detection time based on the comparison result between the cell current and the reference current, the cell current flowing through a plurality of bit lines connected to the plurality of memory cells.

3. The memory device of claim 2, wherein the current sensing circuit comprises a counter configured to measure, as the fail bit detection time, a time from a time point when the current sensing circuit is activated to a time point when the cell current exceeds the reference current.

4. The memory device of claim 3, wherein the counter measures the fail bit detection time based on a reference clock.

5. The memory device of claim 2, wherein the control logic comprises:
an operation parameter storage configured to store offset tables including a plurality of parameters related to the main operation, which are set according to a difference value between the fail bit detection time and the reference time; and
a memory operation controller configured to select the target parameters based on the difference value in the offset table and control the peripheral circuit to perform the main operation according to the target parameters.

6. The memory device of claim 5, wherein the main operation includes at least one of a read operation, a program operation, and an erase operation.

7. The memory device of claim 6, wherein the operation parameter storage stores the offset tables, which include a read offset table including read parameters related to the read operation, and
the read offset table includes at least one of a read voltage, a read pass voltage, a sensing time of the read operation, and a control signal level of page buffers connected to the selected memory cells through the plurality of bit lines.

8. The memory device of claim 6, wherein the operation parameter storage stores the offset tables, which include a program offset table including program parameters related to the program operation, and
the program offset table includes at least one of a program voltage, a program pass voltage, and a step voltage.

9. The memory device of claim 6, wherein the operation parameter storage stores the offset tables, which include an erase offset table including erase parameters related to the erase operation, and
the erase offset table includes an erase voltage applied to word lines connected to the selected memory cells.

10. The memory device of claim 6, wherein the memory operation controller controls the current sensing circuit to perform the fail bit detection operation in a period in which a channel of the selected memory cells is initialized before performing the read operation.

11. The memory device of claim 6, wherein the memory operation controller controls the current sensing circuit to perform the fail bit detection operation in a period in which a channel of the selected memory cells of a program verify operation performed before performing the program operation is initialized.

12. The memory device of claim 6, wherein the memory operation controller controls the current sensing circuit to perform the fail bit detection operation in a period in which a channel of the selected memory cells of a soft program verify operation performed before performing the erase operation is initialized.

13. A method of operating a memory device, the method comprising:
performing a fail bit detection operation on memory cells selected from among a plurality of memory cells;
comparing a cell current flowing through a bit line of the memory cells with a reference current during the fail bit detection operation;
setting target parameters related to a main operation to be performed on the selected memory cells based on a comparison result between a fail bit detection time measured in the fail bit detection operation when the cell current exceeds the reference current and a reference time comprising a time period between turning a page buffer on and turning the page buffer off,
wherein the comparison result comprises a difference value indicating a deterioration of the memory cells over time; and
performing the main operation on the selected memory cells based on the target parameters.

14. The method of claim 13, wherein performing the main operation comprises performing at least one of a read operation, a program operation, and an erase operation.

15. The method of claim 14, wherein setting the target parameters comprises setting the target parameters including at least one of a read voltage related to the read operation, a read pass voltage, a sensing time of the read operation, and a control signal level of page buffers connected to the selected memory cells through a plurality of bit lines, based on a difference value between the fail bit detection time and the reference time.

16. The method of claim 14, wherein setting the target parameters comprises setting the target parameters including at least one of a program voltage, a program pass voltage, and a step voltage related to the program operation, based on a difference value between the fail bit detection time and the reference time.

17. The method of claim 14, wherein setting the target parameters comprises setting the target parameters including an erase voltage related to the erase operation, based on a difference value between the fail bit detection time and the reference time.

* * * * *